Dec. 21, 1965  J. P. DE NICOLA  3,224,259
SPECIMEN GRIP FOR TENSILE TESTING APPARATUS
Filed Jan. 16, 1962  2 Sheets-Sheet 1

Dec. 21, 1965 J. P. DE NICOLA 3,224,259
SPECIMEN GRIP FOR TENSILE TESTING APPARATUS
Filed Jan. 16, 1962 2 Sheets-Sheet 2

United States Patent Office 3,224,259
Patented Dec. 21, 1965

3,224,259
SPECIMEN GRIP FOR TENSILE TESTING
APPARATUS
Joseph P. De Nicola, North Quincy, Mass., assignor to Instron Corporation, Canton, Mass., a corporation of Massachusetts
Filed Jan. 16, 1962, Ser. No. 166,520
3 Claims. (Cl. 73—103)

This invention relates to a testing machine grip useful in tension testing of specimens of material.

Prior art grips have been characterized by numerous disadvantages. The large holding forces needed have been obtained by use of wedging surfaces to force the jaws of a grip together on a specimen, and in getting this action, the jaws have been given a longitudinal movement along with a generally transverse component of gripping movement. The simultaneous longitudinal movement has adverse consequences, however. As the jaws are tightened on the specimen, the longitudinal movement introduces undesired longitudinal compression on the specimen (as well as the desired transverse compression), which adversely affects measurement accuracy. Furthermore, following a test in which a specimen is not broken, the longitudinal movement incident to opening the jaws often is resisted because the teeth of the jaws have become embedded in the specimen, so that the specimen must be unloaded and the jaw faces broken loose by application of an external force. Additionally, such prior art grips have for the most part made no provision for selectively varying the amount of force urging the jaws against the specimen, nor have they provided any means to prevent a violent reaction throwing the jaws wide apart and dropping the specimen incident to the strong longitudinal reaction which accompanies breaking of a specimen, particularly a brittle or strong one, tested to the breaking point, especially undesirable when the specimen is carrying an instrument such as an extensometer. Furthermore, such prior art grips require careful and time-consuming adjustment in order to align the ends of a specimen held between two such grips and such grips along a common longitudinal axis along which force in tension may be applied; and are frequently characterized by jaws which flop around in their mountings and which are only replaceable to accommodate specimens of varying thickness or characteristics with some difficulty.

It is an object of the present invention to provide a new and improved grip which overcomes all the above inadequacies of prior art testing machine grips.

In particular, it is an object of the present invention to provide such a grip in which a longitudinally rigid central core is provided and serves at one end for mounting the grip in the testing machine and at its other end for guiding a pair of jaws in always completely transverse movement which, during normal tightening and loosening of the jaws, holds them always at a constant longitudinal distance from the mounting position in the testing machine.

(It will be understood that usually a pair of grips will be used in any particular test, oppositely oriented. Usually also the longitudinal axes of the grips will be vertical, and the transverse direction will be horizontal. In view of the opposite orientation of a pair of grips when used together, and the fact that non-vertical orientation of axis is possible, the terms longitudinal and transverse have been used herein; and the expression "inner" has been used to indicate a longitudinal direction toward the mounting position, the word "outer" being used thus to indicate a longitudinal direction away from the mounting position and toward the jaws.)

It is a further object to provide an actuator, mounted on said core in fixed longitudinal relation thereto, which actuates longitudinal movement of a frame, and to provide for transverse movement of the jaws responsive to frame longitudinal movement, and to provide means strongly holding the frame in the particular longitudinal position selected to resist such movement and jaw opening even when a specimen is broken in testing.

Further objects, particularly in preferred embodiments of the invention, are to provide cooperating longitudinally threaded portions on said actuator and frame to both give longitudinal movement and to exert great frictional holding power against undesired longitudinal movement; to provide a jaw in which the center of gravity is on the longitudinal axis of the core; to provide against uncontrolled flopping around of jaws when not held against a specimen; and to provide for easy removability and exchange of jaws in the grip.

Other objects, features, and advantages will appear from the following description of a preferred embodiment of the invention, taken together with the attached drawings, in which.

Figures 1, 2:
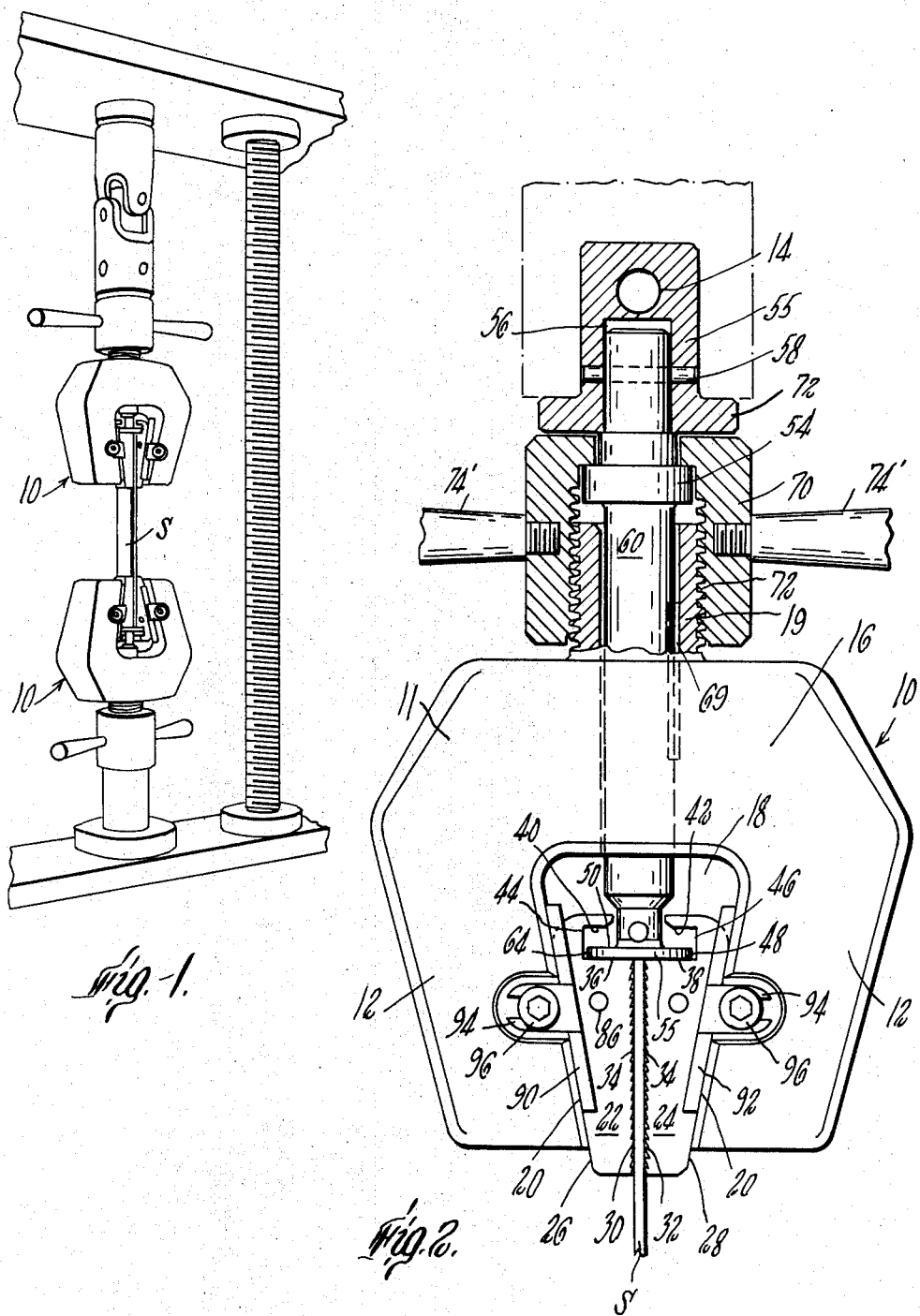
FIG. 1 is an isometric view of a pair of grips according to the invention mounted in a tension testing machine and holding a specimen.
FIG. 2 is a front side elevation, partially broken away on a vertical cross-section, of the preferred embodiment of the invention.
Figures 3, 4:
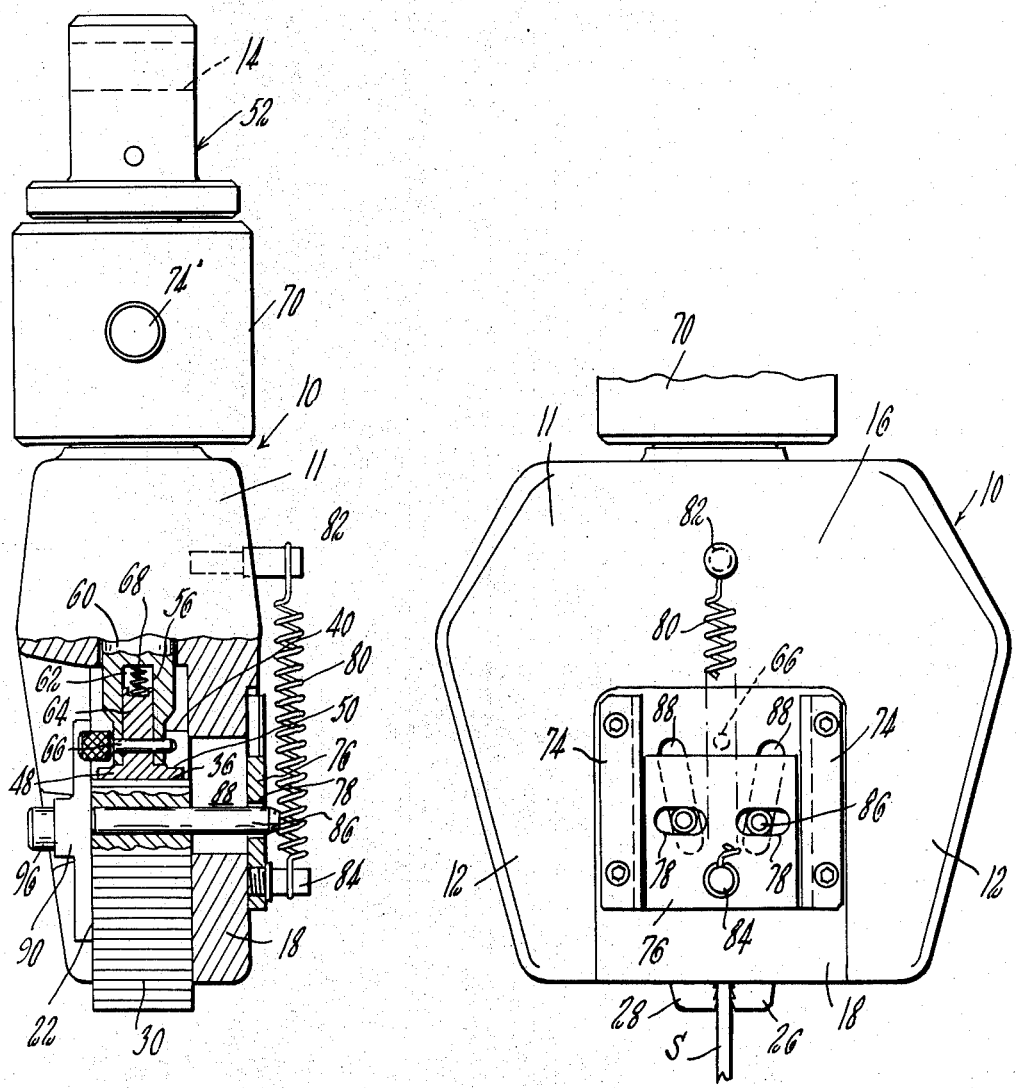
FIG. 3 is an end elevation, partially broken away on a vertical cross-section, of said embodiment.
FIG. 4 is a back side elevation thereof, partially broken away.

Referring now to the drawings, there is shown a grip indicated generally at 10 which includes a frame 11 with a pair of generally longitudinal side pieces 12 connected at their inner ends (i.e., their ends in a longitudinal direction toward the mounting hole 14 defining with a pin on the testing machine the mounting position of the grip therein) by a cross member 16 and through the rest of their length by a back member 18. Extending longitudinally inwardly from the cross member 16 is externally threaded portion 19. The adjacent wedging surfaces 20 of the frame 11 gently converge outwardly (i.e., in a direction longitudinally away from the mounting position).

Resting on the back member 18 and seated on the wedging surfaces 20 are a pair of jaws 22 and 24 with wedging surfaces 26 and 28 cooperating with the wedging surfaces 20. Each jaw includes also a gripping surface 30 and 32 provided with teeth 34 arranged to produce greater bite against movement of a specimen S away from (or outwardly of) the jaws than toward them. The tips of the teeth in each gripping surface define together longitudinal planes at all times parallel to the longitudinal axis of the grip in use. The jaws include facing notches defined by the inner-directed transverse surfaces 36 and 38, the outer-directed transverse surfaces 40 and 42, and the connecting surfaces 44 and 46. The inner- and outer-directed transverse surfaces are spaced a distance greater than that separating the larger abutment surface 48 and the smaller abutment surfaces 50 of the outer end of the core.

The core, indicated generally at 52, includes an inner end near which is the mounting hole 14, an intermediate portion which includes relatively toward the inner end the radially-extending actuator-retaining flange 54 and relatively away therefrom extends through the cross member 16 of the frame 11, which is longitudinally slidably movable relative thereto. The inner end of the core 52 is formed by the inner end flanged member 55, which includes blind hole 56 in which is secured by pin 58 against longitudinal motion relative to flanged member 55 central core member 60. The latter is provided at its outer extremity with a blind axial hole 62 in which is axially slidably fitted the core outer end member 64 which is held therein by transversely slidably removable shear pin 66, frictional contact with which is enhanced by means of spring 68. Key 69 prevents rotation of core 52 relative to frame 11.

The actuator 70 is retained between the flange 72 of flanged member 55 and the actuator-retaining flange 54 against longitudinal movement, but is rotatable relative to the core 52. Internal longitudinal threads 72 engage threaded portion 19 of the frame. Handles 74 secured in the actuator aid in turning it with the desired force.

A pair of retainer plates 74 secured in spaced relation to the back of the back member 18 retain for slidable movement longitudinally of said back member floating plate 76, through which extend a pair of transversely spaced transversely extending slots 78. A spring 80 is stretched between post 82 anchored in an inner portion of said back member and post 84 anchored in an outer portion of said floating plate to bias the latter longitudinally inwardly of said back member. Extending through slots 78 for free movement therein and guidance thereby are the back extremities of pins 86, the front extremities of which are anchored in jaws 22 and 24. Intermediately of their length said pins 86 pass through slots 88 in the back member 18, for free movement therein and guidance thereby. The back member slots 88 extend in gently converging relationship in an outward direction, parallel with the wedging surfaces.

The jaws 22 and 24 are held in operative location by retention bars 90 and 92, which include slotted lugs 94 held in place by easily removable headed screws 96.

In operation, a grip is mounted in a testing machine for example by passing a pin in the latter through mounting hole 14. To open the jaws for acceptance of a specimen, the handle 74' of actuator 70 is turned to rotate the actuator in a counterclockwise direction, looking downwardly, the engagement between actuator and frame being through right-handed threads. Such rotation moves the frame outwardly from the mounting position, or downwardly when the grip is in the position shown in FIG. 2. As the frame moves downwardly, the spring 80 acts on floating plate 76 to retain the latter yieldingly against such motion; the floating plate acts in turn through the pins 86 to hold the jaws 22 and 24 against such downward movement, and with their inwardly directed transverse surfaces 36 and 38 held against the larger abutment surface 48 of the core 52. At the same time, the slots 88 through the back member 18 act as the frame moves downwardly to move the jaws away from each other transversely, at the same time holding in contact the jaws and frame wedging surfaces. To tighten the jaws on the specimen, the actuator is turned in the opposite direction, with the opposite effect. The jaws are thus moved to open and closed position with absolutely no vertical or longitudinal component of motion, thus avoiding both false compression effects in closing and difficulty (owing to the forces built up by the digging-in teeth) in opening. Furthermore, frictional resistance in the threads joining the actuator and frame is such that these parts will not rotate relatively even if a specimen under large tension breaks, despite the resulting large forces, so that the jaws have no tendency to move further apart than their initial setting in such circumstances, and thus do not fly open to drop the specimen. Furthermore, the actuator may be rotated as far as desired in clamping in the specimen, so that the clamping force can be very selectively chosen over an extremely wide range of force quantity possibilities, unlike prior art devices in which the clamping force is constant for each different specimen.

In the preferred embodiment, some longitudinal movement of the jaws is permitted during testing and after the desired initial clamping force is chosen, through the spacing apart of the transverse jaw abutment surfaces 36–38 and 40–42 a distance greater than that separating the core abutment surfaces 48 and 50. As the jaws move downwardly during testing, their force of grip is of course increased by the now-downward movement of the jaws' wedging surfaces along the now-stationary wedging surfaces of the frame. If a specimen breaks the jaws can of course snap back quickly to their original position, but here the initial grip force on the specimen is still maintained, and it thus does not fly from the jaws. The preferred embodiment is also characterized by a core the abutment end of which is provided by a separate outer end abutment member 64 longitudinally slidable in central core member 60, and longitudinally positioned by shear pin 66. The latter may be used as a safety device to prevent undue loading of the cooperating portions of core 52 and the jaws 26 and 28, by shearing at a predetermined load value. Also, this construction permits especially satisfactory testing of specimens expected to stretch substantially without breaking, perhaps with transverse deformation by the jaws owing to softness, by removing the shear pin 66 to extend the range of longitudinal movability of the jaws during the actual testing operation. The notched construction of the jaws, with the construction and stable positioning of the core abutment end and provision of the retention bars 90 and 92 make removal of the jaws and replacement with other sizes quick and easy. The conformation of the frame is so organized that the center of gravity of the entire grip is on the longitudinal axis of the core, so that the grip will automatically hang with its longitudinal axis in the same vertical plane as the center of the mounting hole, making unnecessary time-consuming and less accurate efforts to achieve this result from specimen to specimen by empirical adjustment.

Other embodiments within the spirit of the invention and scope of the appended claims will naturally occur to those skilled in the art.

I claim:

1. A testing machine grip useful in handling specimens in tension testing which comprises: a frame with a pair of generally longitudinal side pieces connected at corresponding ends through a cross member and through the rest of their length by a back member interrupted by a pair of converging slots, said cross member carrying a portion externally threaded about a longitudinal axis, the facing surfaces of said side pieces converging symmetrically about a longitudinal plane including said longitudinal axis to provide an opposed pair of wedging surfaces; a core extending longitudinally through said cross member, said core including a first end with a mounting hole, a radially-extending actuator-retaining flange, a second end defined by a first transversely-extending core abutment surface, and a pair of second transversely-extending core abutment surfaces longitudinally spaced from said first core abutment surface; a pair of jaws, each jaw having a wedging surface disposed against one of said frame wedging surfaces, a first jaw abutment surface disposed throughout mounting of a specimen against said first core abutment surface, a second jaw abutment surface spaced from said first jaw abutment surface a distance greater than the distance between said first core abutment surface and said second core abutment surfaces for engaging the latter thereof after in use said first jaw abutment surfaces move out of contact with said first core abutment surface during testing, and a gripping surface for cooperatively holding a specimen with its axis in said longitudinal plane; a floating plate mounted on the back of said back member for limited longitudinal movement relative thereto and pierced by a pair of transversely spaced transversely-extending slots; a pair of pins, each pin anchored at one end in a said jaw, having its other end extending through one of said floating plate slots, and intermediately extending through said converging back member slots; a generally longitudinally extending spring anchored at one extremity to said frame and at the other extremity to said floating plate, for biasing said floating plate; and an actuator rotatably mounted on said core and held against longitudinal movement by said actuator-retaining flange, said actuator being internally longitudinally threaded to engage the threaded portion of said frame for longitudinally moving the latter, whereby said spring acting through said floating plate and said pins retains said first jaw abutment surfaces in engagement with said first core abutment surface and said outwardly converging back member slots acting through said pins maintain engagement between jaw and frame wedging surfaces.

2. A testing machine grip useful in handling specimens in tension testing which comprises: a frame with a pair of generally longitudinal side pieces connected at corresponding ends through a cross member with a longitudinally threaded portion, facing surfaces of said side pieces converging away from said cross member, symmetrically about a longitudinal plane, to provide an opposed pair of wedging surfaces; a core extending longitudinally through said cross member and terminating in a mounting end and a jaw-engaging end, said frame being slidably longitudinally movable on said core; a pair of jaws, each jaw having a wedging surface disposed against one of the side piece wedging surfaces for slidable movement thereof therealong, a gripping surface for cooperatively holding a specimen with its axis in said longitudinal plane, and a transverse surface disposed against said jaw-engaging end of said core for slidable movement therealong; and an actuator rotatably mounted on said core intermediately of the ends thereof, said core extending through said actuator and being held in fixed longitudinal relation thereto, and said actuator including a longitudinally-extending threaded portion for engagement with the first-mentioned longitudinally threaded portion for selectively longitudinally moving said frame whereby said jaws are moved transversely; said jaw-engaging end of said core being longitudinally slidably removably seated in the remainder of said core, said jaw-engaging end including a first transverse abutment area over the outer surface thereof and two second transverse abutment areas parallel thereto and spaced therefrom; each jaw including facing transverse notches, each notch including a first jaw transverse surface for cooperation with said first core abutment area and a second jaw abutment area parallel thereto and spaced therefrom a distance greater than the distance between said first core transverse abutment area and said second core abutment areas; and a transversely extending slidably removable shear pin selectively holding said jaw-engaging end in the remainder of said core.

3. A tensile testing apparatus specimen grip for accepting a specimen from the front, clamping said specimen without longitudinally stressing it, holding said specimen self-tighteningly during tensile testing thereof, and retaining said specimen despite testing to failure, which comprises:

a frame with a pair of generally longitudinal side pieces and a cross member connecting said side pieces at corresponding ends thereof, said side pieces including facing surfaces converging away from said cross member, symmetrically about a longitudinal plane, to provide an opposed pair of wedging surfaces;

a core extending longitudinally through said cross member and terminating in a mounting end and a jaw-engaging end portion having a guide surface;

a pair of jaws, each jaw having a wedging surface, a guide surface, and a gripping surface;

biasing mechanism urging each of the jaw wedging surfaces against one of the frame wedging surfaces and each of the jaw guide surfaces against the core guide surface, the gripping surfaces being equidistant from said longitudinal plane on opposite sides thereof and being moved transversely relative to each other responsive to relative sliding movement of said jaw wedging surfaces and the respective frame wedging surfaces, the movement of said gripping surfaces being free of any longitudinal component while said jaw guide surfaces are against said core guide surface, said jaws being longitudinally movable away from said core in said tensile testing, responsive to tensile forces on the specimen which override said biasing mechanism; and an actuator mounted on said core intermediately of the ends thereof and engaging said frame to provide selective longitudinal movement thereof and to hold said frame against longitudinal movement during tensile testing, said frame being longitudinally movable on said core;

whereby a specimen loaded between said gripping surfaces from the front may be clamped by actuation of said actuator without longitudinally stressing the specimen, and is firmly gripped despite thinning in testing by accommodating longitudinal movement of the jaws away from the core, and whereby said core and guide jaw surfaces cooperate to limit the transverse distance between said gripping surfaces upon testing to failure to the initially clamped transverse distance, to retain any remaining portion of the specimen in the grip.

References Cited by the Examiner
UNITED STATES PATENTS

| | | | |
|---|---|---|---|
| 306,730 | 10/1884 | Emery | 73—103 |
| 1,233,921 | 7/1917 | Ross | 279—74 |
| 2,447,660 | 8/1948 | Miklowitz | 73—103 |

RICHARD C. QUEISSER, *Primary Examiner.*

DAVID SCHONBERG, *Examiner.*